United States Patent [19]

Brenneisen

[11] 3,726,018

[45] Apr. 10, 1973

[54] MEASURING DEVICE

[75] Inventor: Manfred Brenneisen, 774 Triberg, Germany

[73] Assignee: Schwanog Schwarzwalder Normteile Siegfried Guntert KG, Villingen/Black Forest, Germany

[22] Filed: Apr. 23, 1970

[21] Appl. No.: 31,238

[30] Foreign Application Priority Data

Oct. 27, 1969 Germany..................G 69 41 682.6

[52] U.S. Cl.................................................33/147 J
[51] Int. Cl.................................................G01b 5/00
[58] Field of Search........................33/143 R, 147 R, 33/147 G, 147 H, 147 J, 147 L, 147 T, 165

[56] References Cited

UNITED STATES PATENTS

| | | |
|---|---|---|
| 2,525,186 | 10/1950 | Sosdian..................................33/165 |
| 2,412,421 | 12/1946 | Polk et al..............................33/147 N |
| 3,170,242 | 2/1965 | Deittrick................................33/165 |
| 3,235,968 | 2/1966 | Wertepny..............................33/147 J |

*Primary Examiner*—Leonard Forman
*Assistant Examiner*—Charles E. Phillips
*Attorney*—Michael S. Striker

[57] ABSTRACT

A measuring device has a base member provided with the surface in which an elongated slot is formed. A dial gauge is connected with the base member and has an exposed measuring spindle which is axially displaceable by a predetermined distance corresponding to the maximum dial reading of the dial gauge. A slide member is guided for movement lengthwise of the slot by a distance corresponding to the predetermined distance and coupling means couples the spindle with the slide member for axial displacement of the former in response to movement of the latter. A first measuring jaw projects beyond the aforementioned surface and is guided in the slide member for movement lengthwise of the slot and arrestable at desired locations, and a second measuring jaw projects beyond the surface out of the slot.

14 Claims, 7 Drawing Figures

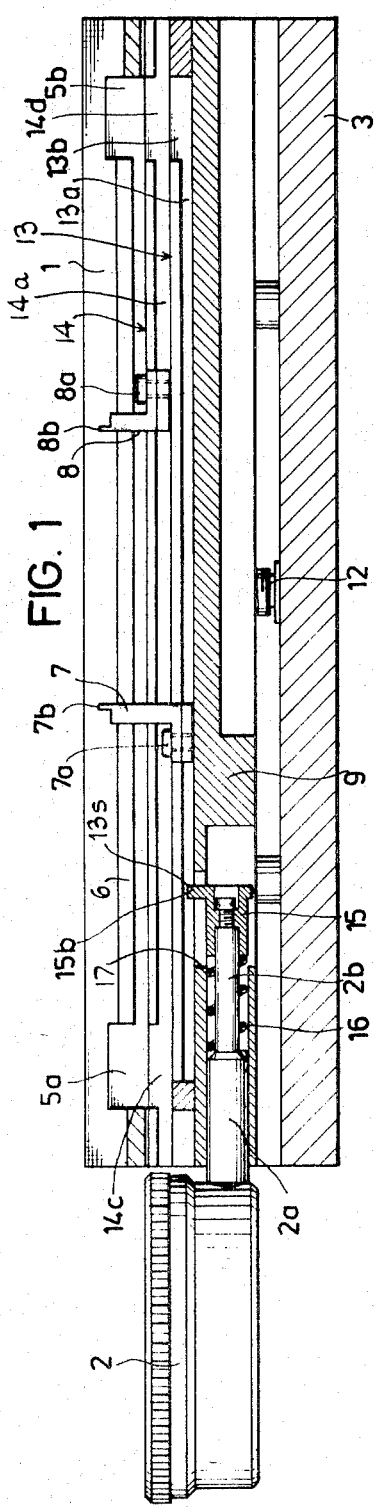
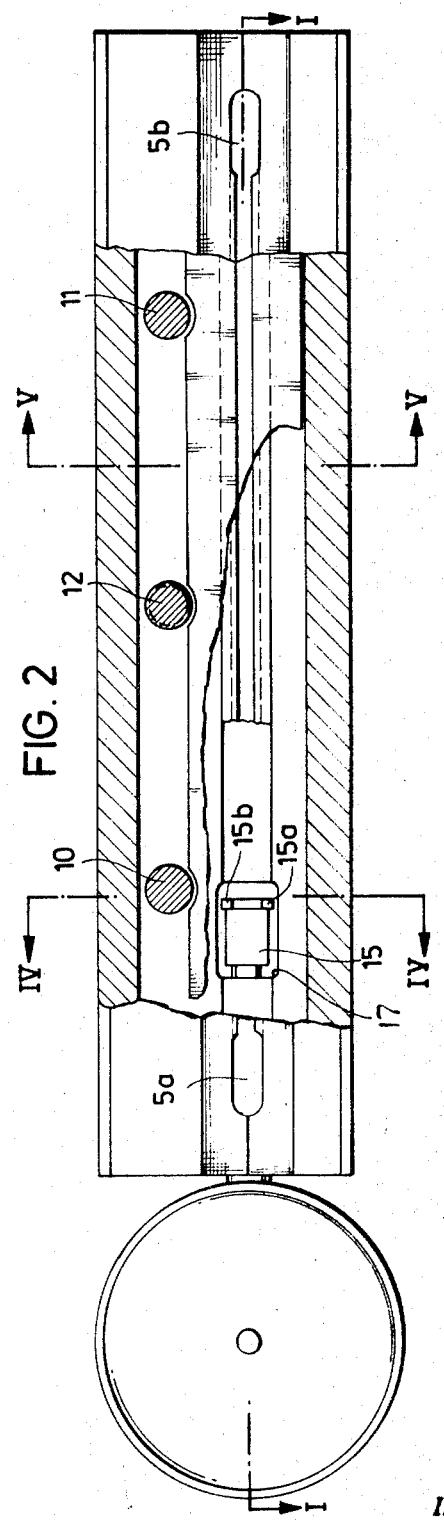

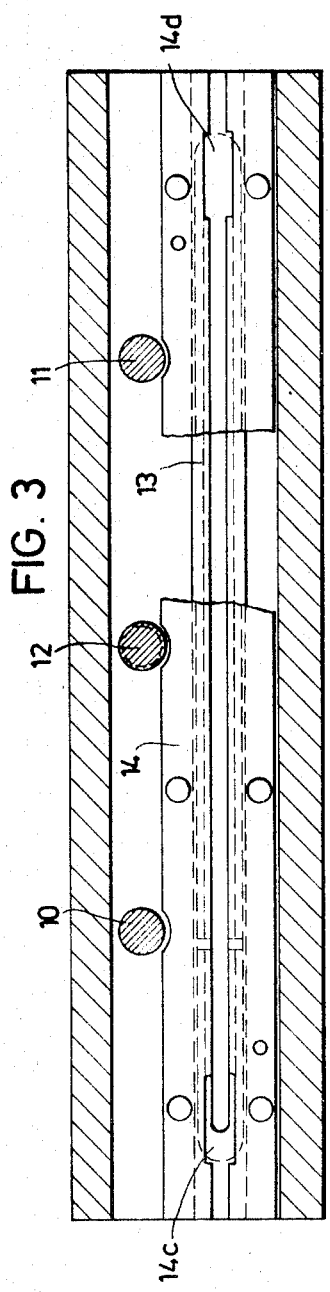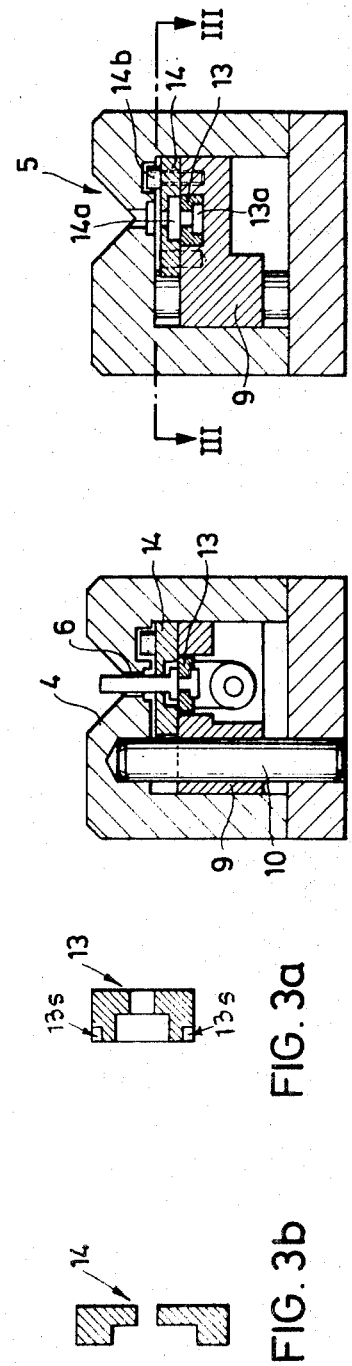

MEASURING DEVICE

BACKGROUND OF THE INVENTION

The present invention relates generally to measuring devices, and more particularly to dial-type measuring devices.

For measuring thicknesses and widths of articles, it is known to use various types of gauges, sliding gauges, micrometer gauges and measuring rods. It is also known, however, to use dial gauges where the measured values are indicated by a pointer on a dial. Such dial gauges have a shaft by means of which they are secured to a base member on which the object to be measured is supported, and the measuring spindle—which is axially displaceable and whose axial displacement is indicated by the pointer moving over the dial of the gauge—is moved over the object to be measured. Such measurements are both accurate and simple to make, but this type of measuring arrangement has the disadvantage that dial gauges—particularly those providing a very precise indication—are capable of providing only a limited dial reading so that only relatively small measurements can be taken. To increase the range of measurements which can be taken with such dial gauges it is known to utilize so-called end setting rods or primary setting rods with known dimensions which are inserted between the object to be measured and the dial gauge, thereby increasing the usable range of such dial gauges. The problem with these make-shift arrangements is, however, that they make the taking of readings or measurements rather complicated and are much too difficult and time-consuming especially where dimensional control of mass produced items is required.

SUMMARY OF THE INVENTION

It is, accordingly, an object of the present invention to overcome the aforementioned disadvantages.

A more particular object of the present invention is to provide a measuring device using a dial gauge, the measuring device being capable of providing measurement determinations within a wide range despite the use of a dial gauge having a relatively small dial reading capacity.

A further object of the invention is to provide such an arrangement which can be used for taking thickness measurements as well as width measurements.

In pursuance of the above objects, and others which will become apparent hereafter, one feature of the invention resides, briefly stated, in a measuring device comprising a base member having a surface which is provided with an elongated slot. A dial gauge is connected with this base member and has an exposed measuring spindle axially displaceable by a predetermined distance corresponding to the maximum dial reading of the dial gauge. A slide member is guided for movement lengthwise of the slot by a distance corresponding to the predetermined distance. Coupling means couples the spindle with the slide member for axial displacement of the former in response to movement of the latter. A first measuring jaw projects beyond the surface and is guided in the slide member for movement lengthwise of the slot, being arrestable at desired locations. A second measuring jaw projects beyond the surface out of the slot.

With this arrangement the spacing between the measuring jaws can be varied in accordance with the distance to be measured on the object which is to be measured, and if desired it can be adjusted with end settings or primary settings, in which case the dial gauge only indicates the deviations from the once set starting measurement.

According to a further embodiment of the invention the second jaw can also be slidably mounted on a guide rail in which case the maximum measuring distance of the arrangement according to the present invention is determined by the maximum distance obtainable between the measuring jaws.

It is advantageous that the slide member and the guide rail be arranged one above the other and provided with elongated slits of substantially T-shaped cross-section through which the respective jaws extend. In order to make the device according to the present invention suitable for both thickness and width measurements, i.e., for measurements of both internal and external dimensions for an object to be measured, it is necessary that the measuring jaws be reversible in their position with reference to one another. For this purpose a further embodiment of the invention provides the ends or end portions of the aforementioned slot as well as the slits with enlargements or cutouts through which the measuring jaws can be introduced into and withdrawn from the slot and the slits, respectively.

It is advantageous to provide the measuring table, constituted by the base member, with a groove which in particular accommodates cylindrical objects to be measured. Advantageously, the groove may be bounded by two or more planar surfaces which extend parallel in the direction of elongation of the groove and whose planes may meet with each other longitudinally and thereby define an angle. Depending upon the diameter of the object to be measured, or the distance of the point to be measured from the measuring jaws, the latter must extend into the slot to a greater or lesser extent. In order to provide for adaptation of the novel device to these various circumstances which can occur, the dial gauge, the slide member and the guide rail, if provided, are mounted on a support which can be height-adjusted within the base member. For instance, a spindle and guide rods can be used for effecting such height adjustment or displacement of the support and thereby such components as are carried thereby. The displacement of course then takes place in the direction normal to the aforementioned surface, towards or away from the same.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWING

FIG. 1 is a longitudinal section taken on the line I—I of FIG. 2 and illustrating one embodiment of the invention;

FIG. 2 is a top-plan view of the device illustrated in FIG. 1, with the measuring table partly broken away;

FIG. 3 is a section taken on line III—III of FIG. 5 with the guide rail partially broken away;

FIG. 3a is a diagrammatic cross-section detail view of one component of the device illustrated in FIGS. 1–3;

FIG. 3b is a view similar to FIG. 3 but showing another component of the device in FIGS. 1–3;

FIG. 4 is a section taken on the line IV—IV of FIG. 2; and

FIG. 5 is a section taken on the line V—V of FIG. 2.

DESCRIPTION OF THE PREFERRED EMBODIMENTS

As illustrated in FIGS. 1–5, the device according to the present invention comprises a substantially block-shaped base assembly or measuring stand 1 with which a dial gauge 2 is connected. Such dial gauges are well known and need therefore not be further described, other than to point out that it has a shaft 2a by means of which it is connectable with a support as still to be described, and a measuring member or spindle 2b axially displaceable of itself and with reference to the shaft 2a and connected in the manner known from such dial gauges with the indicator of the gauge so that, in response to axial displacement of the measuring spindle 2b in one or the opposite axial direction of the same, the indicator moves over the dial of the gauge and indicates thereon a measurement corresponding to the extent of axial displacement of the measuring spindle 2b.

The measuring stand or base assembly is composed essentially of a solid base plate 3 and a cover portion 4 which is of substantially U-shaped cross section, as evident from FIG. 4. The upper surface of the portion 4 is constructed as a measuring table and provided with a groove 5 of prism-shaped cross-section (see FIG. 5). The object to be measured can be placed into this groove 5. In its lower region the groove 5 merges into a slot 6 or measuring track which extends lengthwise of the stand 1. Arranged within the stand 1 is a support 9 which cooperates with a spindle 12 and, in response to rotation of the latter, can be adjusted in its height, that is it can be displaced towards and away from the slot 6. Bolts or guide rods 10 and 11 serve to guide the support 9 so that it cannot tilt and jam.

The support 9 is provided with a slot-shaped recess in which a first guide rod or slide member 13 is accommodated which is longitudinally slidable by a distance corresponding to the maximum dial reading of the dial gauge. It, in turn, is provided with a longitudinal first slit 13a (see FIG. 5) of substantially T-shaped cross section in which there is mounted a measuring jaw 7 for sliding movement, a screw 7a being provided for arresting the measuring jaw 7 at any desired location along the slit 13a. The measuring jaw 7 extends upwardly into and through the slot 6.

A second guide rail 14 is arranged above the slide member or first guide rail 13 and is also provided with a longitudinal second slit 14a similar to the slit 13a and also being of substantially T-shaped cross-section, but wider than slit 13a. A screw 14b or other suitable means serves to connect the rail 14 immovably with the support 9. The jaw 7 extends through the slit 14a before it enters the slot 6. In addition, there is provided a second measuring jaw 8 which extends through the slit 14a and is shiftable lengthwise of the same, a screw 8a being provided by means of which the jaw 8 can be arrested at any desired position of the slit 14a.

FIGS. 3a and 3b show the cross-sectional configuration of the slide member or first guide rail 13 and the second guide rail 14, respectively, and such configuration is also evident from FIGS. 4 and 5.

The slot 6 is provided at its opposite ends with widened end portions or cutouts 5a, 5b. Similarly, the slit 14a of the guide rail 14, is provided at its opposite ends with widened end portions or cutouts 14c and 14d, whereas the slit 13a is provided with enlargements or cutouts 13b. The purpose of these is to permit the insertion from above into the slot and slits, respectively, of the measuring jaws 7 and 8. This makes it possible, depending upon the circumstances of a given measurement to be taken, to position the measuring jaw 8 to the right or to the left of the measuring jaw 7. It is this feature which makes the device according to the present invention suitable both for thickness and for width measurements.

The shaft 2a of the dial gauge 2 is inserted into a bore of the support 9 provided for this purpose, and connected with the support 9. A member 15 is provided at the leading end of its measuring spindle 2b and has projections or noses 15a or 15b which extend through slot 17 formed in support 9 into corresponding recesses 13s (see FIG. 3a) provided in the slide member 13. Thus, the measuring spindle 2b is directly connected with the rail 13 in force transmitting relationship therewith by means of the member 15, so that shifting of the slide member 13 and the jaw 7 is directly transmitted to the dial gauge 2.

A pretensioned pressure spring 16 surrounds the measuring spindle 2b and abuts at one end against the shaft 2a and at the other end against the member 15; the spring 16, in conjunction with the non-illustrated return or restoring spring of the dial gauge 2, serves for returning the slide member 13 and the measuring jaw 7 connected therewith to their starting or zero position.

To take a measurement of an object, the height of the contact faces 8b and 7b of the jaws 7 and 8, must first be adjusted and accommodated to the dimensions of the object to be measured. For this purpose the support 9 is raised or lowered by turning the spindle 12 in requisite sense. Now the distance of the jaws 7 and 8 with reference to one another is adjusted, for instance by means of so-called end settings or primary settings. If thicknesses are to be measured with the device, the jaw 8—which in operation is stationary—is to be positioned to the right of the slidable jaw 7, as seen with reference to the view shown in FIG. 1. For width measurements, on the other hand, the jaw 8 is released, withdrawn from the slits and slot 6, and inserted in the manner already described at the left-hand side of the movable jaw 7, whereupon it is then fixed again on the guide rail 14. It will be appreciated that with this construction it is possible to use for the measuring purposes which are to be carried out, a dial gauge having a relatively small dial reading—and which is therefore very precise—and yet to carry out measurements of large dimensions, which may be either thickness measurements or width measurements. This has not been possible heretofore with the constructions known in the prior art. The present invention therefore provides a significant improvement in that it affords a measuring device which is not only usable in a wide variety of applications but which can also provide extremely precise measurements.

It will be understood that each of the elements described above, or two or more together, may also find a useful application in other types of constructions differing from the types described above.

While the invention has been illustrated and described as embodied in a measuring device, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims:

1. A measuring device, comprising a base defining a measuring face having an elongated slot, the effective length of said slot substantially determining the largest dimension measurable with said device; a gauge arrangement mounted on said base and having an indicating dial, a measuring member movable with respect to said base and coupling means coupling said movable measuring member to said indicating dial, whereby movement of said movable measuring member with respect to said base will produce a corresponding reading on said dial; a first measuring jaw movably mounted on said base projecting through said slot above said measuring face of said base and movable along substantially the entire effective length of said slot, and having a first abutment portion adapted to abut against one side of an object to be measured, said jaw being fixable in any desired selected position on said base along the effective length of said slot, whereby to define a settable point of reference; a second measuring jaw having a second abutment portion and mounted for movement along substantially the entire effective length of said slot and projecting therethrough above said measuring face of said base and movable into abutment against the opposite side of said object to be measured, so that the distance between the respective abutment portions of said first and second measuring jaws corresponds to the dimension of said object to be measured; and force-transmitting means connected to said second measuring jaw for joint movement therewith and adjustable relative thereto, said force-transmitting means operatively joining said second measuring jaw to said measuring member of said gauge arrangement so that displacement of said second measuring jaw with respect to the point of reference defined by said first measuring jaw produces a corresponding dial reading on said dial.

2. A device as defined in claim 1, wherein said measuring member is permanently biased in direction opposite said displacement of said second measuring jaw.

3. A device as defined in claim 1, said base including a first guide rail extending along the length of said slot, one of said measuring jaws being guided by said first guide rail for sliding movement therealong.

4. A device as defined in claim 3, said base including a second guide rail extending along the length of said slot, the other of said measuring jaws being guided by said second guide rail for sliding movement in lengthwise direction thereof.

5. A device as defined in claim 3, said first guide rail defining a first elongated slit, one of said jaws projecting through said first slit and being movable along the length thereof, and said first slit having a widened end portion whereby to facilitate mounting and dismounting of said one of said jaws.

6. A device as defined in claim 5, said first slit having an additional widened end portion, whereby to further facilitate mounting and dismounting of said one of said jaws, and whereby to make possible positioning of said one of said jaws at a location along said track to one or the other side of the other of said jaws, and thus permit measurement of an internal or external dimension of an object to be measured.

7. A device as defined in claim 6, said base including a second guide rail defining a second elongate slit substantially parallel with said first slit, one of said jaws projecting through both of said slits and being movable along the length thereof, and said second slit having at least one widened end portion corresponding to one of said widened end portions of said first guide rail, whereby to make possible positioning of one of said jaws at a location along said track to one or the other side of the other of said jaws, and thus permit measurement of an internal or an external dimension of an object to be measured.

8. A device as defined in claim 3, said first guide rail being slidable in direction along said slot, and one of said jaws being mounted on said first rail for sliding movement therewith.

9. A device as defined in claim 8, said first guide rail being in force-transmitting relationship with said measuring member of said gauge arrangement and constituting said transmitting means, and being slidable a distance corresponding to the range of movement of said measuring member, and thereby slidable a distance corresponding to the range of reading of said dial.

10. A device as defined in claim 8; and further including spring means for biasing said measuring member to a position corresponding to "zero" dial reading.

11. A measuring device as defined in claim 5, wherein said slit is of at least substantially T-shaped cross-section in planes transversely to its elongation.

12. A measuring device as defined in claim 3; further comprising a support arranged in said base and supporting said dial gauge, and first guide rail; and displacing means for displacing said support, and thereby said dial gauge, slide member and first guide rail, in direction normal to said surface towards and away from the same at the will of an operator.

13. A measuring device as defined in claim 12, said displacing means comprising a displacing spindle journalled in said base and engaging said support on a side thereof which faces oppositely away from said surface.

14. A measuring device as defined in claim 13; further comprising guide pins guiding said support for displacement towards and away from said surface.

* * * * *